United States Patent
Gueugneaud

(10) Patent No.: US 6,431,574 B1
(45) Date of Patent: Aug. 13, 2002

(54) BICYCLE FORK PIVOT, AND BICYCLE FORK EQUIPPED WITH THE SAME

(75) Inventor: Jean-Marc Gueugneaud, Saint Clair de la Tour (FR)

(73) Assignee: Time Sport International, Varennes Vauzelles (FR)

( * ) Notice: Subject to any disclaimer, the term of this patent is extended or adjusted under 35 U.S.C. 154(b) by 0 days.

(21) Appl. No.: 09/509,319

(22) PCT Filed: Sep. 23, 1998

(86) PCT No.: PCT/FR98/02037

§ 371 (c)(1),
(2), (4) Date: Mar. 24, 2000

(87) PCT Pub. No.: WO99/15395

PCT Pub. Date: Apr. 1, 1999

(30) Foreign Application Priority Data

Sep. 24, 1997 (FR) .............................................. 97 11881

(51) Int. Cl.[7] .............................................. B62K 19/16
(52) U.S. Cl. ................... 280/279; 280/281.1; 280/274; 264/512
(58) Field of Search ................... 280/274, 279, 280/281.1; 264/255, 258, 257, 512

(56) References Cited

U.S. PATENT DOCUMENTS

| | | | | | |
|---|---|---|---|---|---|
| 4,828,285 A | * | 5/1989 | Foret et al. | .................. | 280/279 |
| 4,900,048 A | * | 2/1990 | Derujinsky | ............... | 280/281.1 |
| 5,039,470 A | * | 8/1991 | Bezin et al. | ................. | 264/255 |
| 5,059,057 A | | 10/1991 | Graef | .......................... | 403/298 |
| 5,411,463 A | | 5/1995 | Brookstein | .................... | 492/38 |
| 5,435,869 A | | 7/1995 | Christensen | ................ | 156/175 |
| 5,692,764 A | * | 12/1997 | Klein et al. | ................. | 280/279 |

FOREIGN PATENT DOCUMENTS

| | | | | |
|---|---|---|---|---|
| EP | 0 352 663 | 1/1990 | | |
| FR | 2 684 062 | 5/1993 | ................. | 280/276 |

\* cited by examiner

*Primary Examiner*—Brian L. Johnson
*Assistant Examiner*—Daniel Yeagley
(74) *Attorney, Agent, or Firm*—Young & Thompson

(57) ABSTRACT

A bicycle fork tubular pivot (5) includes a cylindrical wall having a longitudinal geometrical axis (X—X), made of a composite material and including at least a reinforcing inner longitudinal partition (7, 8), in particular a partition (7) parallel to the bicycle center line (P), and a partition (8) orthogonal to the former.

8 Claims, 3 Drawing Sheets

BICYCLE FORK PIVOT, AND BICYCLE FORK EQUIPPED WITH THE SAME

CROSS REFERENCE TO RELATED APPLICATION

This is the 35 USC 371 national stage of international application PCT/FR98/02037, filed on Sep. 23, 1998, which designated the United States of America.

FIELD OF THE INVENTION

The invention relates to a tubular bicycle fork pivot comprising a cylindrical wall which has a longitudinal geometric axis.

BACKGROUND OF THE INVENTION

It is known that in bicycles, particularly competition bicycles, weight is an important factor, particularly when traveling over uneven or mountainous terrain. Attempts have therefore been made at lightening the overall weight by reducing the weight of the various components that make up a bicycle. It is, however, necessary that such a reduction in weight should not be accompanied by an unacceptable reduction in the mechanical strength of the bicycle component concerned.

The applicant company has thus developed a bicycle fork made of composite material, according to Patent FR-B-2 684 062, filed on Nov. 25, 1991, which is entirely satisfactory and which enjoys widespread use in very high-level cycling competitions.

It is recalled that the term "composite material" is used to describe a material which is made up of fibers of high mechanical strength, particularly carbon fibers and/or glass fibers, generally in the form of laps, which during a molding operation are embedded in a resin of the epoxy or polyester or equivalent type, which then hardens.

This fork of the prior art is combined with a metal fork pivot in order to exhibit the desired strength properties. However, this metal fork pivot, generally made of alloyed steel, adds weight to the assembly.

Tests have been carried out in an attempt to make the fork pivot out of composite material in order to save weight. These tests have shown that the overall performance of the fork equipped with such a pivot constitutes a retrograde step, both in terms of the frontal strength (that is to say the ability to withstand the efforts involved in braking and longitudinal running jolts which are due to the unevenness of the surface being ridden over) and in terms of the lateral strength (that is to say the ability to withstand transverse efforts, particularly when the cyclist is riding out of the saddle, tilting the bike from side to side.

The size of the pivot, particularly its outside diameter, is governed by the accessories that will be assembled on top of it. One such accessory is the headset bearing cup, which has a standardized diameter of 26.5 mm. Another such accessory is handlebar stems of the "threadedless headset" type, with a bore diameter of 25.4 mm which, unlike handlebar stems which are fixed into the pivot tube by an expander which locks inside the pivot tube, surround the outer surface of the cylindrical wall of the pivot and are locked in place by clamping around this wall.

As the interior volume of the tubular pivot is unoccupied, because the stem is no longer housed therein, attempts have been made at increasing the thickness of the cylindrical wall of the pivot made of composite material, toward the inside, with a view to obtaining performance that is equivalent to that of a metal pivot.

The results obtained with such a pivot made of composite material but with a thicker wall are not satisfactory.

SUMMARY OF THE INVENTION

The object of the invention is, above all, to provide a bicycle fork pivot which, while being more lightweight than the conventional metal pivots, allows mechanical strength performance at least equivalent to that of metal pivots to be obtained.

It is furthermore desirable for such a pivot to remain relatively simple and as economic as possible to manufacture.

According to the invention, a bicycle fork tubular pivot comprising a cylindrical wall which has a longitudinal geometric axis is characterized in that it is made of a composite material and comprises at least one longitudinal internal reinforcing partition.

Advantageously, the pivot comprises a partition parallel to the plane of travel of the bicycle (the mid-plane of the forks), this partition being capable of absorbing frontal stresses, and a partition orthogonal to the previous one and capable of absorbing lateral stresses.

As a preference, each longitudinal internal partition passes approximately through the longitudinal geometric axis of the pivot.

The pivot preferably comprises at least one longitudinal partition extending along a diameter.

The pivot may comprise several longitudinal radial partitions distributed angularly about the geometric axis and extending approximately between this axis and the cylindrical wall, these partitions being linked together in the region of the longitudinal geometric axis.

Two successive radial partitions advantageously constitute the approximately flat faces of an elemental prism, the cross section of which is in the shape of a circular sector, this prism having a convex outer face.

Each prism consists of laps of fibers wound around the contour of the corresponding sector.

The number of radial partitions may be an even number, the radial partitions being approximately diametrically opposed and aligned in pairs, a group of two radial walls thus aligned forming a diametral partition.

An outer cylindrical winding of laps of fibers surrounds the convex faces of the elemental prisms.

The pivot may be secured to an insert made of composite material, in the shape of an inverted U, for connecting to the fork crown. This insert may also comprise at least one internal reinforcing partition.

The pivot is advantageously manufactured around a mandrel or core split into a cross shape in the region in which the partitions are produced. The dimensions of the partitions may change according to the size of frame to be equipped.

The structure of the pivot and of the partitions consists of a textile armature made up of two-way and one-way fibers of the same type as those that make up the remainder of the fork.

A preform is made and placed in a tool which has the final dimensions of the part. The fibers may be preimpregnated with resin. The molding operation is performed next. If the fibers are not preimpregnated, a resin (epoxy, polyester or equivalent) is injected through the mold. The resin impregnates all of the structure thus binding all the constituent parts together. This is then cured by raising the temperature of the assembly (depending on the type of resin used).

After cooling, the fork is released from the mold.

The fork may be manufactured in a single molding operation involving the pivot, the insert, the fork crown, the fork blades and the dropouts.

BRIEF DESCRIPTION OF THE DRAWINGS

Apart from the arrangements set out hereinabove, the invention consists in a certain number of other arrangements which will be discussed more explicitly later with regard to one embodiment which is described with reference to the appended drawings, but which is not in any way restrictive.

DETAILED DESCRIPTION OF THE INVENTION

Figure 1:
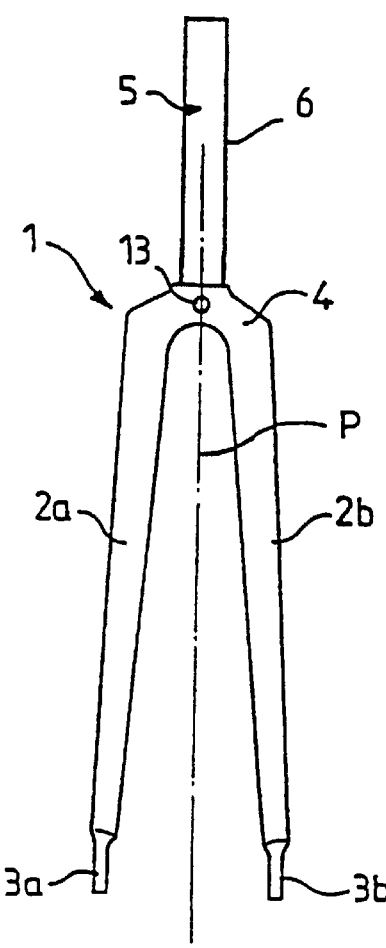
FIG. 1 of these drawings is an elevation of a bicycle fork.

Referring to FIG. 1, there can be seen a bicycle fork 1 comprising two fork blades 2a, 2b equipped, at their lower end, with dropouts 3a, 3b for attaching the front wheel axle which passes between the fork blades. A fork crown 4, located at the top, connects the fork blades, and a tubular pivot 5 is connected rigidly to the crown 4.

The mid-plane P of the forks 1 coincides with the mid-plane of the front wheel, and defines the running plane of the bicycle.

The tubular pivot 5 comprises a cylindrical wall 6 which has a longitudinal geometric axis X—X located in the plane P.

The pivot 5 is made of a composite material, particularly one consisting of carbon fibers embedded in cured resin of the epoxy or polyester or similar type.

Figure 3:
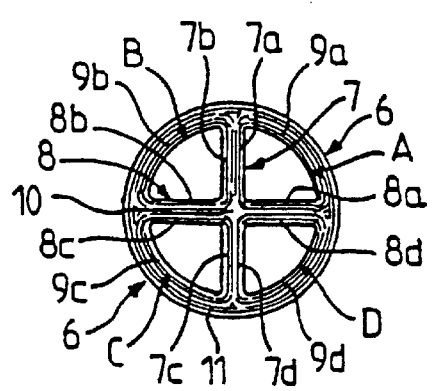
FIG. 3 is a section through the pivot on the line III—III of FIG. 2.
Figure 2:
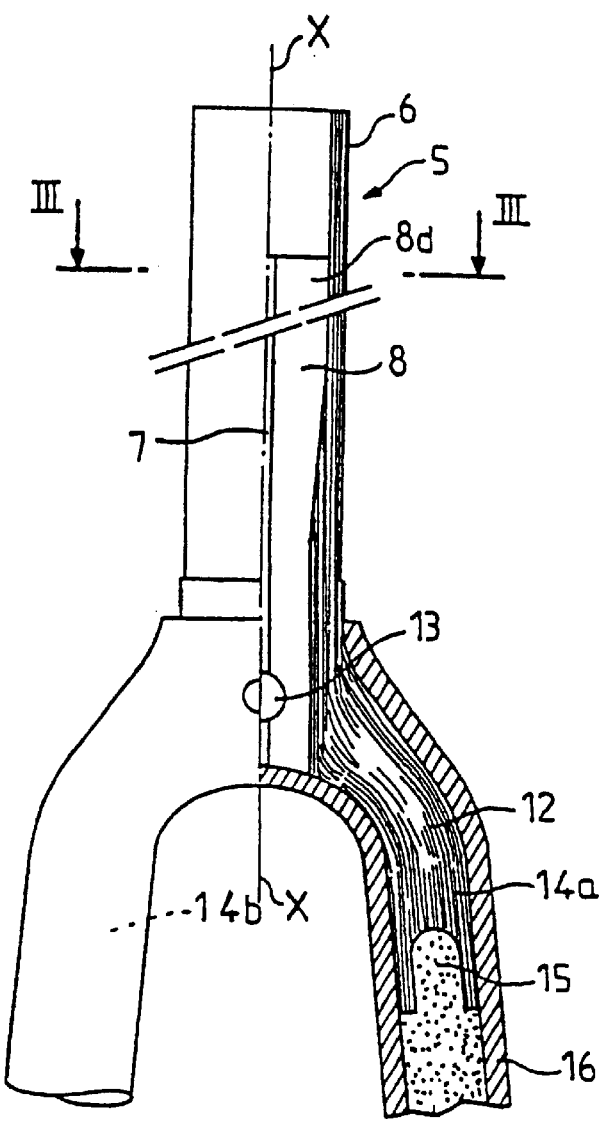
FIG. 2 shows, half in vertical axial section and half as an external view, a fork pivot according to the invention and a fork crown associated with this pivot.

As visible in FIG. 2 and FIG. 3, the pivot 5 is partitioned and, in the example depicted, comprises a longitudinal internal partition 7 extending along a diameter in the running plane P of the bicycle; this partition 7 has the task of absorbing the frontal stresses. The pivot 5 also comprises a diametral partition 8 perpendicular to the partition 7 and tasked with absorbing the lateral stresses.

The cross-shape diametral partitions 7 and 8 are advantageously formed by eight radial internal reinforcing partitions 7a, 7b, 7c, 7d; 8a, 8b, 8c, 8d, distributed at 90° about the geometric axis X—X and extending approximately between this axis and the cylindrical wall 6. The partitions 7a, 7b, . . . 8c, 8d are joined together by the resin in the region of the longitudinal geometric axis X—X.

Two radial partitions such as 7a, 8a, spaced angularly by 90°, constitute the approximately flat faces of an elemental prism which in cross section has the shape of a circular sector A, representing a =quarter of a circle. This prism has a convex outer face 9a. The cross section of the prism may be hollow, or may filled with a low-density core or foam.

Three other right-angle sectors B, C, D are formed in a similar way to the sector A.

Each elemental prism consists of a textile armature obtained with laps of fibers wound around the contour of the associated sector A, B, C, D. The four elemental prisms are juxtaposed so that in cross section they reconstruct a circle.

The radial partitions are approximately diametrically opposed and aligned in pairs; for example, the partition 7a is aligned with 7d, the partition 7b with 7c. Two aligned radial walls form an elemental diametral partition. In the example considered, the partition 7 is formed of two juxtaposed elemental diametral partitions consisting of the radial partitions 7a, 7d on the one hand, and the partitions 7b, 7c on the other hand. The same is true of the transverse partition 8.

It may thus be seen the textile armature, for example of the sector A, follows the outer contour of this sector and plays a part in forming the radial partition 7a, the radial partition 8a and the convex arc 9a; each corner of the sector is rounded.

Thus, at the centre of the cross formed by the walls 7 and 8, there is an approximately lozenge-shaped space 10 with curved sides which from the outside are concave, and across which laps of composite material do not pass. The space 10 is filled with resin.

By virtue of this arrangement, the partitions 7a, . . . 8d, may be continuous along their entire length, without there being any interruption caused by another partition at right angles crossing them.

The group of four sectors thus formed is enveloped with an outer cylindrical winding 11 of laps of fibers, around a complete circular contour constituting a kind of belting.

In FIG. 2, the longitudinal partitions 7 and 8 have been depicted essentially from the outside.

The pivot 5 may be manufactured separately, independently of an insert in the shape of an inverted U for connecting to the fork crown. In this case, the lower end of the pivot could be assembled with a metal insert of the same kind as in FR-B-2 684 062. The end of the composite pivot would then be tightly push-fitted into an insert housing and bonded to the wall of this housing.

In the embodiment of FIG. 2, the pivot 5 is secured to an insert 12, also made of composite material, in the shape of an inverted U. The pivot 5 and the insert 12 are made during one same operation. The insert 12 may be entirely filled with fibers, or be partitioned like the pivot. As a preference, each branch of the U of the insert 12 has a cross section similar to that of FIG. 3, with two partitions in a right-angled cross, one of the partitions being parallel to the running plane P, the other partition being orthogonal to this plane. Fibers of the composite material which make the connection with the pivot 5 have been depicted diagrammatically in FIG. 2.

Passing through the lower end of the pivot 5 is a hole 13, the axis of which is orthogonal to the axis X—X and which lies in the mid-plane P of the forks. This hole 13 houses an embedded nut for a break calliper support spindle.

The insert 12 has two branches 14a, 14b pointing downward and connected by the base of the inverted U. Each branch 14a, 14b has a cavity which is open at the bottom and in which the corresponding end 15 of a corresponding fork blade core is engaged. Each core is surrounded by a layer of composite material 16 enveloping the insert 12, including the base which connects the branches 14a, 14b.

The pivot 5 equipped with the insert 12 is assembled with the blades of the fork in a subsequent operation.

It would, however, be possible to manufacture the entire forks with pivot, insert, fork blades and dropouts in a single operation.

The pivot 5 is advantageously manufactured around a mandrel 17 (FIG. 4), for example a metal mandrel, which has two longitudinal diametral slits 18, 19 at right angles along part of its length.

Figure 4:
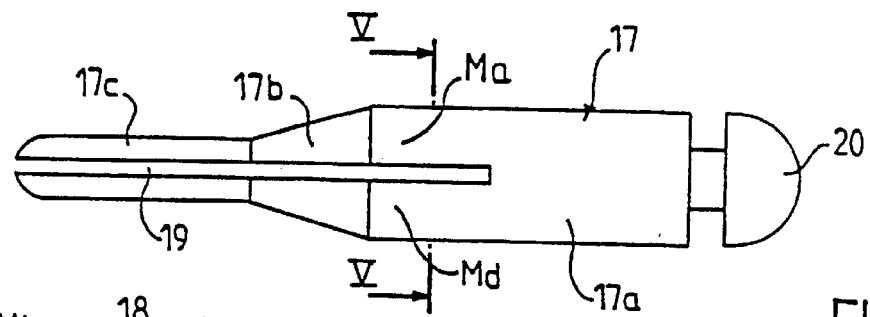
FIG. 4 is a diagrammatic elevation of a mandrel for manufacturing the pivot according to the invention.
Figure 5:
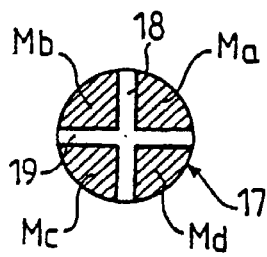
FIG. 5 is a section on the line V—V of FIG. 4.

The mandrel 17 comprises a cylindrical body 17a equipped, at its right-hand end according to FIG. 4, with a handle 20. The cylindrical body 17a is extended, toward the left according to FIG. 4, by a frustoconical part 17b of decreasing diameter, itself extended by a cylindrical snout 17c with a smaller cross section than the body 17a.

The slits 18, 19 open to the snout 17c end, continue over the entire frustoconical part 17b and over a fraction of the length of the body 17a.

The slits 18 and 19 thus define four right-angle sectors Ma, Mb, Mc, Md with convex outer faces, secured together by that part of the body 17a which is not slitted.

To manufacture the pivot 5, its textile armature, made up of two-way and one-way fibers, is produced as follows.

First of all, each of the sectors Ma . . . Md of the mandrel is surrounded separately with a winding of laps of fibers. To perform this winding, the lap of fibers is slipped through two parts at right angles of the slits 18, 19 so as to surround the two flat faces of a sector, Ma for example, then the lap is wound against the outer convex face of this sector Ma, to be slipped once more through the two parts at right angles of the slits 18, 19.

Figure 6:
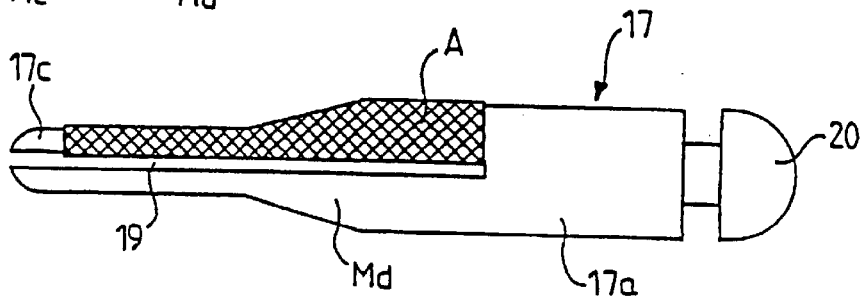
FIG. 6 shows, similarly to FIG. 4, the mandrel, a first sector of which is covered with laps of fibers.

Winding continues over the entire useful length of the slits 18 and 19. The frustoconical part 17b and a fraction of the body 17a are surrounded as illustrated in FIG. 6.

By way of nonlimiting indication, the width of the slits 18, 19 in the mandrel may be of the order of 2 mm; the thickness of the laps of fibers surrounding the sectors Ma . . . Md may be between about 0.3 mm and 0.5 mm.

Once this operation has been repeated for all four sectors Ma . . . Md, their textile armatures display the configuration illustrated in FIG. 7. An empty space may remain at the middle of the slits 18, 19.

The partitions 7, 8 described with regard to FIG. 3 correspond to those parts of the textile armature which are located inside the slits 18, 19.

The dimensions of the slits 18, 19, particularly their length, may change according to the size of bicycle frame to be equipped.

Figure 7:
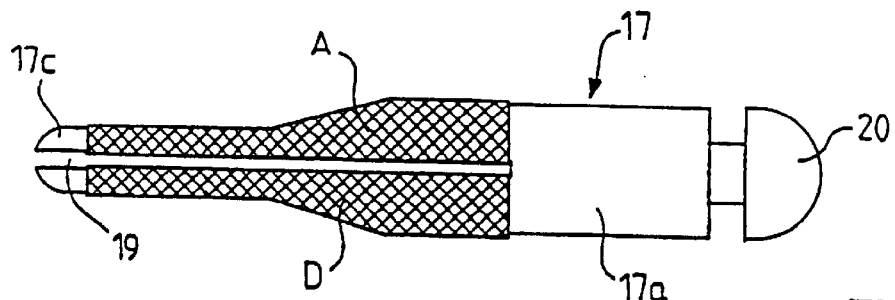
FIG. 7 shows, similarly to FIG. 6, the mandrel, all the sectors of which have been covered with laps of fibers so as to produce the internal partitions.

The textile armature sectors depicted on the mandrel of FIG. 7 are then enveloped, over their entire length, with a textile armature, also made up of laps of high-strength fibers, particularly carbon fibers. The envelope continues axially toward the handle 20 beyond the end of the slits 18, 19, that is to say beyond the partitions 7 and 8. This textile armature envelope 11 contributes to the outer cylindrical wall of the pivot. The cylindrical wall may be extended upward, beyond the upper end of the partitions 7, 8, as visible in FIG. 2.

Figure 8:
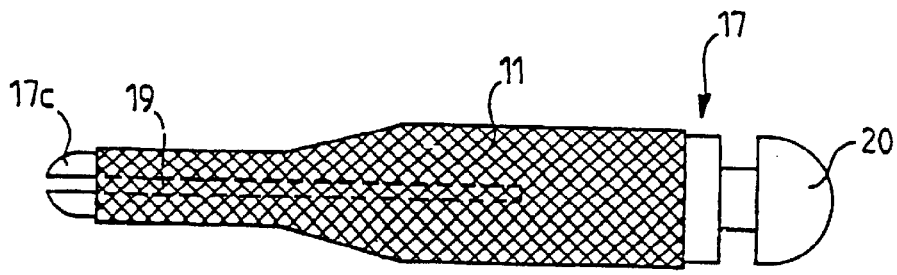
FIG. 8 shows, similarly to FIG. 7, the mandrel enveloped with laps of fibers surrounding the sectors produced previously.
Figure 9:
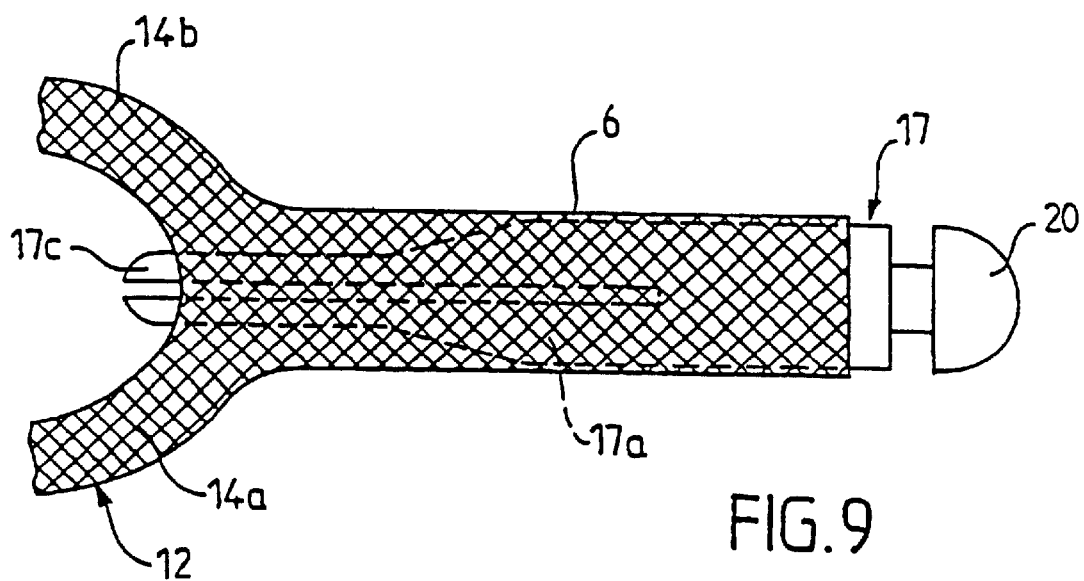
FIG. 9 shows, similarly to FIG. 8, the mandrel, on the left-hand end of which a U-shaped insert has been made out of composite material for connecting to the fork crown. Finally.

Next, the insert 12, also made of composite material, is produced, by surrounding the textile armature already in place on the snout 17c, as shown in FIG. 8. The frustoconical part 17b is also enveloped until an outer cylindrical wall of approximately constant diameter from the body 17a as far as the snout 17c is obtained, as illustrated in FIG. 9; the two branches of the insert 12 depart one from each side, and the tip of the snout 17c remains free of any surrounding of composite material. This thus yields the perform illustrated in FIG. 9.

Figure 10:
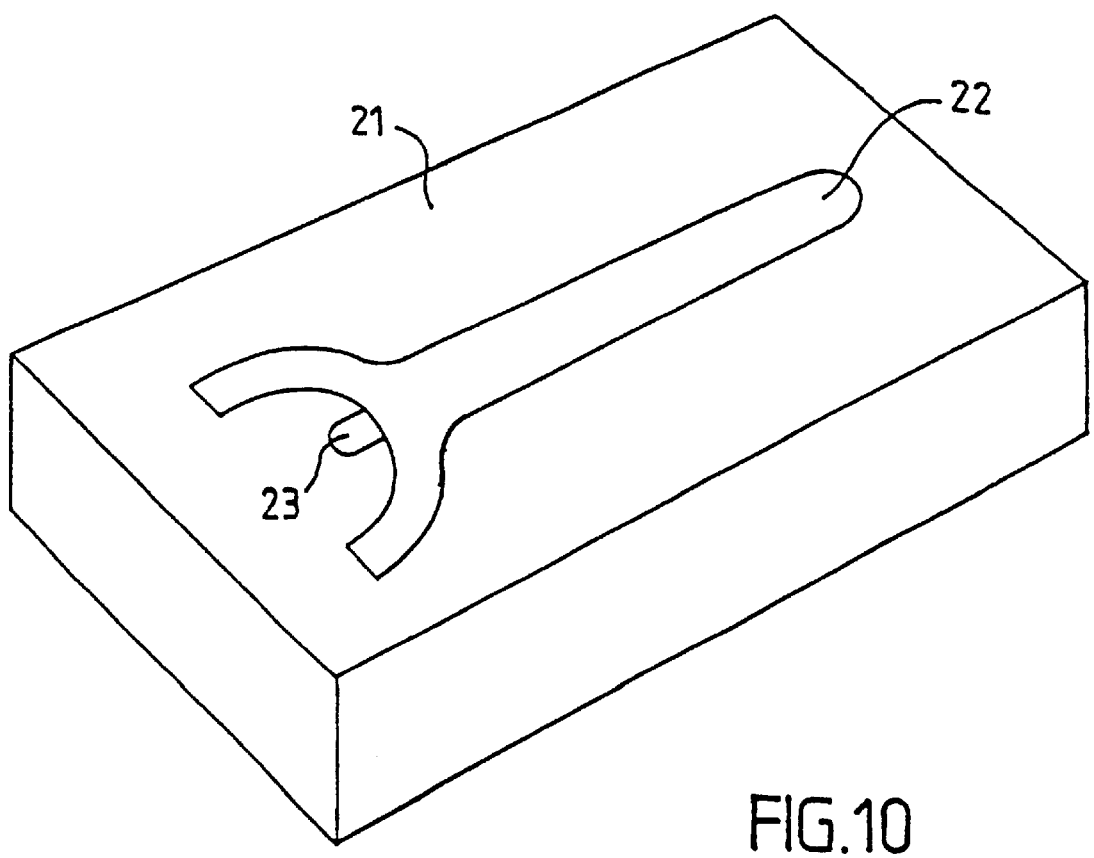
FIG. 10 is a diagrammatic perspective view of the lower part of a mold intended to take the mandrel with the preform of FIG. 9, for the molding operation with the injection of resin.

This preform is then placed in a mold, the lower part 21 of which is depicted in FIG. 10, which has the final dimensions of the part. The lower part of the mold 21 has a cavity 22 to take the preform of FIG. 9, with a housing 23 for the end of the snout 17c. This housing 23 allows the preform to be correctly positioned in the cavity 22.

The mold is then closed with an upper part (not depicted) which has a complementary cavity. The molding operation can then begin, with the injection of an epoxy, polyester, etc. resin through the mold, via injection ducts, not depicted.

The resin impregnates the entire textile armature of the pivot 5 and of the insert 12, thus bonding all the constituent parts together.

As an alternative, the preform may be made using fibers which are preimpregnated with resin so that the phase of injecting resin into the mold, as just described, is no longer necessary.

The resin is cured by raising the temperature of the mold and pivot assembly, according to the type of resin used.

After cooling, the pivot and the insert are released from the mold and the mandrel 17 is extracted by sliding it away from the insert 12. The partitions 7, 8 are formed inside the wall 6 in the region of the slits 18, 19. The fork blades are produced and assembled with the insert 12 and with the pivot 5 later.

As an alternative, instead of the mandrel 17 which is extracted at the end of molding, it is possible to employ a low-density core, of the same shape as the mandrel with slits in a cross configuration, but which remains in place in the pivot after the resin has been cured.

The forks 1 may be manufactured in their entirety in a single molding operation, comprising the pivot 5, the insert 12, the fork crown 4, the fork blades 2a, 2b and the dropouts 3a, 3b.

Regardless of the embodiment, the presence of partitions inside the pivot 5 makes it possible, with a pivot made of composite material, to obtain levels of performance with a fork made of composite material which are entirely comparable with those obtained with a fork equipped with a metal pivot.

The partitions 7, 8 give the pivot 5 good resistance to radial clamping, such as that exerted by a handlebar stem of the "threadless headset" type.

Although the partitions 7, 8 described form a cross at right angles, it would be possible to envisage some other arrangement, for example three radial partitions spaced 120° apart, one of the partitions being in the running plane and the other two being symmetric with respect to this plane.

What is claimed is:

1. A bicycle fork tubular pivot made of a composite material, and comprising:

a cylindrical wall having a longitudinal geometric axis;

said pivot including at least one longitudinal internal reinforcing partition, and several longitudinal internal radial partitions distributed angularly about the longitudinal geometric axis and extending approximately between said longitudinal geometric axis and said cylindrical wall;

said radial partitions being linked together in the region of the longitudinal axis;

at least two successive radial partitions constituting approximately flat faces of an elemental prism having a cross section which is in the shape of a circular sector; said prism having a convex outer face, and each prism comprising laps of fibers wound around the contour of a corresponding circular sector.

2. The bicycle fork tubular pivot according to claim 1, wherein said at least one longitudinal internal reinforcing partition comprises a first partition parallel to a plane of travel of the bicycle, and a second partition orthogonal to the first partition.

3. The bicycle fork tubular pivot according to claim 1, wherein said at least one longitudinal internal reinforcing partition extends along a diameter.

4. The bicycle fork tubular pivot according to claim 1, wherein the number of radial partitions is an even number, and the radial partitions are approximately diametrically opposed and aligned in pairs, a group of two radial walls thus aligned forming a diametral partition.

5. The bicycle fork tubular pivot according to claim 4, wherein the even number of radial partitions is eight, and the eight radial partitions form four juxtaposed circular sectors and two diametral partitions in a cross configuration.

6. The bicycle fork tubular pivot according to claim 1, further comprising an outer cylindrical winding of laps of fibers surrounding the convex outer faces of the elemental prisms.

7. The bicycle fork tubular pivot according to claim 1, wherein said pivot is secured to an insert made of composite material, in the shape of an inverted U, for connecting to a fork crown; said insert comprising at least, one internal reinforcing partition.

8. A bicycle fork made of a composite material, and made as one piece with a bicycle fork tubular pivot according to claim 1.

* * * * *